United States Patent Office 3,376,191
Patented Apr. 2, 1968

3,376,191
METHODS OF PRODUCING PESTICIDAL COMPOSITIONS CONTAINING PECAN SHELL FLOUR AS A CARRIER AND A PRODUCT THEREFROM
William P. Reeves, Valdosta, Ga., assignor to Southeastern Reduction Company, Inc., Valdosta, Ga.
No Drawing. Filed Aug. 23, 1965, Ser. No. 481,961
4 Claims. (Cl. 167—42)

This invention relates to the growing of tobacco generally and has particular utility for the growing of certain products including tobacco in the shade for use as cigar wrappers, to the care thereof during growth including by the use of matter which will keep down injury to the product caused by disease, insects or pests, to the material used in such care and protection, the method employed in the particular use, and the method of producing from a particular starting material a particular resultant product for a particular use.

The invention relates especially to a composition containing pecan shell flour as a carrier for toxic substances for application to cigar wrapper type tobacco leaves shade grown in a relatively limited area where South Georgia and North Florida meet and in the Connecticut River Valley of North Connecticut and South Massachusetts, to the use of such pecan shell flour as a carrier for insecticides on the order of DDT, parathion and thiodan, and fungicides on the order of zineb and maneb, and herbicides, and in which the pecan shell dust or flour is produced by double disk runner attrition mills of for example 36" diameter.

The carrier or diluent for insecticides, pesticides or herbicides necessarily is of an organic nature, it having been found that inorganic carriers or diluents of less expensive products such as clays mined instead of something grown as a vegetable, have been found unsatisfactory since it causes burning of the leaves with an undesirable residue resulting, such residue being white or gray and non-compatible with the color of the cured tobacco leaf.

Nut shells including those from pecans have been used as organic fillers and extenders in various ways, some of which are disclosed in patents, Boyce 2,191,421, McLane 2,283,275, Coleman et al. 2,350,324, Ayers 2,507,465, and Arnold et al. 2,547,730. These various uses, however, have not produced a carrier or diluent for certain insecticides and pesticides and a particular use, nor have they produced a particular method, or a method of production from a particular starting material or a particular product for a particular use. On the other hand, these patents have left a problem and have fallen short of the desired end solved by the present invention.

Tobacco stems have been ground to dust, sterilized and used as a carrier or diluent for insecticides. However, it has been found that unsterilized stems will transmit a virus from the parent plant and, consequently, this kind of carrier is unsatisfactory. Flour from pecan shells, although they would normally be a by-product or waste, does not transmit a virus and such shells when ground with a double disk runner attrition mill of, for example, 36" diameter has been found highly satisfactory for use as a diluent for insectides, fungicides, herbicides and the like and can be used in sufficient quantities to serve the purpose for which they were intended, it being impossible to distribute minute quantities of the insecticides, fungicides, or the like except with a carrier or diluent so that they can be discharged into the atmosphere by aerial application whether by airplanes or otherwise.

It has been found that the attempts to use pecan shell flour produced by roller mills, ring roll mills, centrifugal impact mills and the like, particularly by those located at a distance from the tobacco growing areas, have not been satisfactory and did not solve the problem or produce a composition limited to certain insecticides for a particular use, or provide a method for a particular use, or a method originating from a particular starting material for a particular product for a particular use.

It is an object of the invention to provide a composition of a particular nature including an appropriate insecticide, fungicide, or pesticide carrier or diluent composed of pecan shell flour, although the invention includes the use of other nut shells or substances, whether English walnuts, black walnuts, or other nut shells or substances as a carrier or diluent with an inherent content of tannin providing a resultant color compatible with that of shade grown, cured leaf tobacco in a manner that any residue will blend therewith instead of other carriers or diluents which leave a residue such as, for example, a composition produced from clays which would be of different shades and therefore impair the value of the cured leaf.

Another object of the invention is to provide a carrier or diluent for use in the manner indicated and of pecan shell flour of a particle size which will pass 80 mesh and with a major portion passing a much finer mesh.

A further object of the invention is to provide a carrier or diluent containing sufficient pecan shell or other flour which can be mixed with other substances including clays to impart more absorptive qualities for various percentages of oil-carried poisons, sterilized tobacco stem to impart more free flowing qualities to the stems, and all of which can be commercially produced.

Other objects and advantages of the invention will be apparent from the following description:

Briefly stated, the present invention involves the use of pecan, English, or black walnut or other shells, or hard substance or substances, as a carrier or diluent for an insecticide, fungicide, pesticide, or the like, for use on shade grown tobacco, or a carrier or diluent composed of an organic material, non-toxic to plants, which will have adequate color compatibility to the plants therefore constituting an improvement over anything heretofore known.

In order to successfully manufacture the quality pecan shell or other flour for this application, the necessary steps are:

(1) The raw material is selected from good, bright pecan, English, or black walnut shells, or other substance or substances, or basic material having a residual content of 0.4% to 1.0% tannins, free of meats, mold, trash, or other deleterious substance.

(2) The shells or raw material is caused to pass over permanent magnetic separators to remove trap iron, and then over vibrating screens to remove strings, tacks, and similar trash.

(3) The shells then are caused to pass through an impact or hammer type pulverizer having sufficient impact and velocity to dislodge the clinging shell liners composed largely of a high tannin bearing material.

(4) The resultant combination of fines and broken shells then are cause to pass over sieves of 40 U.S. mesh to separae the hard dense portions of the shells from the softer liners with the softer liners discarded or sold for various other commercial purposes.

(5) The cleaned dense shells, approximately minus ¼ of an inch square, are then passed through an aspirating chamber under air suction to remove any light flaky particles having the same particle size as the dense shells, such separation being accomplished due to the difference in density and utilizing the air to obtain separation.

In the practice of the invention, the cleaned shells are ground in a 36" double runner attrition mill. The charge to the mill is then pneumatically conveyed to a contrifugal air separator and then discharged to a 48" double whizzer or high speed mechanical air separator. The dust which cannot resist the undraft created by the whizzer blades is then classified by its action into flour. The rejected material is then discharged from the mechanical separator and conveyed back to the grinder for further reduction.

The above described flour provides a satisfactory carrier or diluent for poison for application on shade grown tobacco. One such application would use, for example, approximately 10% DDT, 1% parathion and 6½% zineb. The resulting combination or product thus obtained is packed and sold or delivered to aerial applicators under contract who broadcast this material from the body of dusting airplanes over the fields of tobacco covered by the shading media. This composition is applied approximately fourteen to nineteen times during the planting and growing cycle of the tobacco from the time the seeds are sown in the plant beds until final harvest is completed in the field.

The number of times irrigation is necessary to maintain the growth of the plant depends, of course, upon the number of times it has rained during the growing season, such being determining factors for applying more or less pesticides in this diluent to control the growth and propagation of pests.

The amount of pesticides or fungicide dispensed by the applicators is normally determined by the entomologists employed by the various companies selling the finished composition to the tobacco growers.

After the tobacco leaves are cropped or primed from the plant, they are placed in barns where they are air dried and later graded as to color and quality. It is extremely important that any residue left on the leaf be compatible with the color of the cured leaf. In this case, the floor residue remaining on the leaf will not cause a down grading and resultant loss in value of the cured leaf.

It will be apparent from the foregoing that a carrier or diluent is provided particularly suitable to carry insecticides, fungicides, or pesticides without accompanying viruses, and with color compatability to avoid down grading of the product to which applied.

It will be obvious to those skilled in the art that variout changes may be made in the invention without departing from the spirit and scope thereof and therefore the invention is not limited except as indicated in the accompanying claims.

I claim:

1. The method of producing a pesticidal product for protecting shade grown tobacco comprising removing the softer spongy inner liners from pecan shells to reduce their tannin content to the range of 0.4% to 1.0%, grinding the shells to a powder of sufficient fineness to pass an 80 mesh screen with a major portion passing a finer mesh, and mixing the resultant flour with a pesticide selected from the group consisting of insecticides and fungicides.

2. The method of claim 1 in which the shells are ground in a double runner attrition mill.

3. The method of claim 1 in which the pesticide is a mixture of 10% DDT, 1% parathion, and 6½% zineb.

4. A product for protecting plants from insects and fungi comprising a mixture of a flour ground from pecan shells to sufficient fineness to pass an 80 mesh screen with a major portion passing a finer mesh after removal of the softer spongy inner liners from the shells to reduce their tannin content to the range of 0.4% to 1.0%, and a pesticide selected from the group consisting of insecticides and fungicides.

References Cited

UNITED STATES PATENTS

| | | | |
|---|---|---|---|
| 2,191,421 | 2/1940 | Boyce | 167—42 |
| 2,281,785 | 5/1942 | Mohr | 167—42 |
| 2,283,275 | 10/1942 | McLane | 167—42 |
| 2,350,324 | 6/1944 | Coleman | 167—42 |
| 2,507,465 | 5/1950 | Ayers | 167—42 |
| 2,547,730 | 4/1951 | Arnold | 167—42 |

ALBERT T. MEYERS, *Primary Examiner.*

S. J. FRIEDMAN, *Assistant Examiner.*